United States Patent
Nousiainen

(10) Patent No.: US 9,727,433 B2
(45) Date of Patent: Aug. 8, 2017

(54) CONTROL VALVE DIAGNOSTICS

(75) Inventor: Sami Nousiainen, Espoo (FI)

(73) Assignee: METSO AUTOMATION INC., Vantaa (FI)

(*) Notice: Subject to any disclaimer, the term of this patent is extended or adjusted under 35 U.S.C. 154(b) by 1139 days.

(21) Appl. No.: 13/695,336

(22) PCT Filed: Apr. 30, 2010

(86) PCT No.: PCT/FI2010/050352
§ 371 (c)(1),
(2), (4) Date: Jan. 8, 2013

(87) PCT Pub. No.: WO2011/135155
PCT Pub. Date: Nov. 3, 2011

(65) Prior Publication Data
US 2013/0110418 A1    May 2, 2013

(51) Int. Cl.
*G06F 11/30* (2006.01)
*G01L 7/00* (2006.01)
*F16K 37/00* (2006.01)

(52) U.S. Cl.
CPC .......... *G06F 11/30* (2013.01); *F16K 37/0083* (2013.01); *F16K 37/0091* (2013.01); *G01L 7/00* (2013.01)

(58) Field of Classification Search
CPC . G06F 11/30; G06F 19/00; G01L 7/00; F16K 37/0083
See application file for complete search history.

(56) References Cited

U.S. PATENT DOCUMENTS

| 4,344,142 | A | * | 8/1982 | Diehr, II | B29C 35/0288 264/325 |
|---|---|---|---|---|---|
| 4,949,288 | A | | 8/1990 | Bookout | |
| 5,115,672 | A | | 5/1992 | McShane et al. | |
| 5,747,697 | A | | 5/1998 | Johnson et al. | |
| 5,970,430 | A | * | 10/1999 | Burns et al. | 702/122 |
| 6,026,352 | A | | 2/2000 | Burns et al. | |

(Continued)

FOREIGN PATENT DOCUMENTS

EP    0 858 625 B1    6/2001
EP    1 019 790 B1    12/2005

OTHER PUBLICATIONS

Alice Corporation, Supreme Court Decision, 2013.*

(Continued)

*Primary Examiner* — John Breene
*Assistant Examiner* — Mohammad Islam
(74) *Attorney, Agent, or Firm* — Oliff PLC

(57) ABSTRACT

In a diagnosis method of a control valve, position data representing a position of a control valve, and pressure data representing a pressure difference over a valve actuator, and optionally travel direction of the control valve, is measured during online operation of the control valve. The position data and the pressure difference data are processed to contain data around starting points of a plurality of individual travel movements of the control valve during normal online operation of the control valve. Finally, a valve signature graph of the control valve is determined based on the processed position and pressure difference data, collected at a plurality of points along the travel range of the control valve during online operation of the control valve.

4 Claims, 5 Drawing Sheets

(56) References Cited

U.S. PATENT DOCUMENTS

| | | | | |
|---|---|---|---|---|
| 6,131,609 | A * | 10/2000 | Metso | F16K 37/0091 137/552 |
| 6,272,401 | B1 | 8/2001 | Boger et al. | |
| 6,453,261 | B2 | 9/2002 | Boger et al. | |
| 6,745,084 | B2 | 6/2004 | Boger et al. | |
| 6,751,575 | B2 | 6/2004 | Lenz et al. | |
| 7,478,012 | B2 | 1/2009 | Tewes et al. | |
| 2001/0032518 | A1* | 10/2001 | Boger et al. | 73/861 |
| 2004/0228173 | A1* | 11/2004 | Schoonover | 365/158 |
| 2005/0257618 | A1 | 11/2005 | Boken | |
| 2008/0004836 | A1* | 1/2008 | Tewes | G05B 23/0221 702/182 |
| 2008/0065355 | A1 | 3/2008 | Bredau et al. | |
| 2008/0082180 | A1 | 4/2008 | Blevins et al. | |
| 2009/0222124 | A1* | 9/2009 | Latwesen | G05B 23/0235 700/110 |
| 2011/0062358 | A1* | 3/2011 | Kawamura | F16K 31/04 251/129.01 |
| 2011/0155259 | A1* | 6/2011 | Volpert | G05D 7/0635 137/87.04 |

OTHER PUBLICATIONS

HART Field Communication Protocol: An Introduction for Users and Manufacturers, HART Communication Foundation, 1995.

"DVC6000 Series FIELDVUE Digital Valve Controllers," Product Bulletin 62.1:DVC6000, Feb. 2008, EMERSON Process Management, pp. 1,4; p. 7 last par.; p. 9 left column; Figs. 3,7.

"AMS Valvelink Software Signature Series Performance Testing," Product Bulletin 62.1: Signature, Apr. 2008, EMERSON Process Management, pp. 1-2.

"Fisher FIELDVUE DVC6000 SIS Series Digital Valve Controllers for Safety Instrumented System (SIS) Solutions," Product Bulletin 62.1:DVC6000 SIS, Nov. 2008, EMERSON Process Management, pp. 4.

Apr. 18, 2011 International Search Report issued in International Application No. PCT/IF2010/050352.

\* cited by examiner

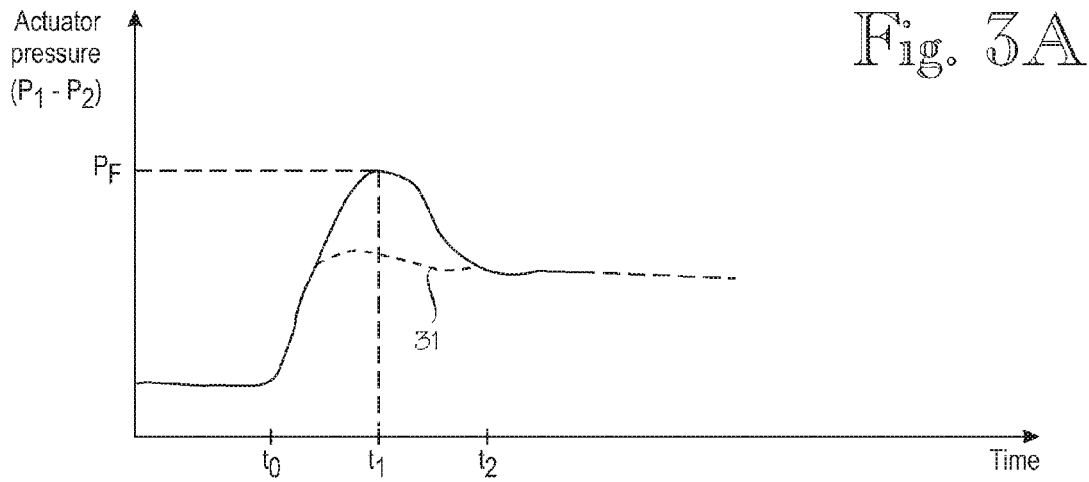

Fig. 3A

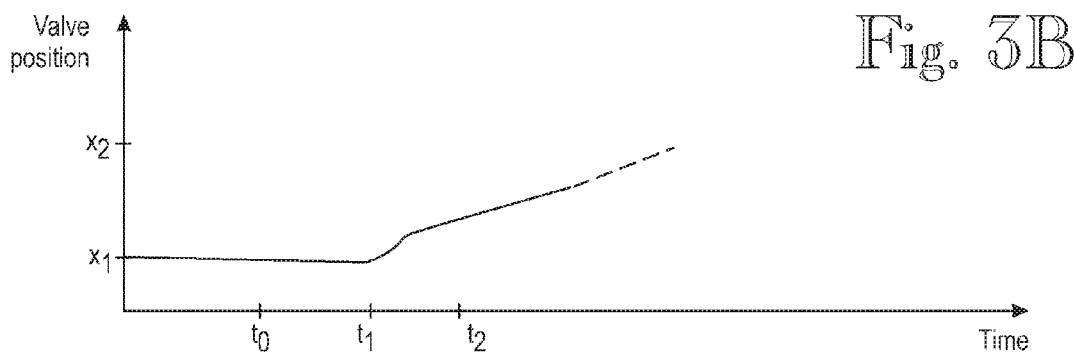

| monitoring a position of a control valve and a pressure difference, over a valve actuator, and optionally travel direction of the control valve, during normal online operation of the control valve | — 41 |

| processing the position data and the pressure difference data to contain data around starting points of a plurality of individual travel movement of the control valve during normal online operation of the control valve | — 42 |

| providing the processed data with time stamps | — 43 |

| determining an updated valve signature graph of the control valve based on the processed data | — 44 |

CONTROL VALVE DIAGNOSTICS

FIELD OF THE INVENTION

The present invention relates generally to diagnostics of control valve, and particularly to techniques for determining valve signature for a control valve.

BACKGROUND OF THE INVENTION

A control valve is generally used for a continuous control of a liquid or gas flow in different pipelines and processes. In a processing industry, such as pulp and paper, oil refining, petrochemical and chemical industries, different kinds of control valves installed in a plant's pipe system control material flows in the process. A material flow may contain any fluid material, such as fluids, liquors, liquids, gases and steam. The control valve is usually connected with an actuator, which moves the closing element of the valve to a desired open position between fully open and fully closed positions. The actuator may be a pneumatic cylinder-piston device, for example. The actuator, for its part, is usually controlled by a valve positioner, sometimes defined as a valve controller, which controls the position of the closing element of the control valve and thus the material flow in the process according to a control signal from the controller.

The high-performance intelligent valve positioner is an important device when a long-term control solution is required. Even though its role may sometimes be crucial, the performance of a control valve does not result solely from the smart positioner. The control valve itself must also be working well. Such problems as high friction and backlash have been associated with control valves.

Achieving loop performance starts with correct valve selection and sizing. Analyzing the installed flow characteristic is important in order to optimize control performance. Loop performance is maintained only if all the components in the control loop function correctly. It is crucial to service valves at regular intervals in order to keep the process sufficiently efficient and to maintain loop performance throughout the whole life cycle. It is also essential to predict when control valves should be serviced. Servicing valves before it is actually required could work, but it would be a rather expensive and time consuming way of doing maintenance. Waiting until valves fail and cause a possible unscheduled shutdown can also be very costly. Ideally, only those valves that really require maintenance should be serviced during a shutdown. To accomplish this, advanced valve diagnostics and/or monitoring, including online and offline diagnostics, would have to be utilized.

So-called offline diagnostics is performed during a shutdown of the process. During a shutdown, it is possible to monitor and analyze valves to check whether they need servicing or not by using, for example, a valve signature test. The valve signature plots an actuator pressure versus travel for a positioner. Comparing a recently generated valve-signature curve to the original factory curve can uncover deterioration in performance. However, this approach has problems: 1) Any view of this test shows only an instant in time; it does not provide any predictive value. 2) Because the test is performed during shutdown, i.e. the valve is not under true process conditions, the analysis result does not reflect the real situation. 3) The duration of the shutdown needs to be minimized, which means that users do not have time to test, analyze and make decisions on every valve package. 4) You cannot plan maintenance activities and the need for spare parts in advance. 5) Comparison to previous results is a tedious process.

Instead of this, it should be possible to analyze valve data just before shutdown, while the process is still in operation. In this way, those valves requiring maintenance can be pinpointed beforehand. This requires devices with online diagnostic capabilities. Online diagnostics makes it possible to monitor valve performance while the process is running, not only during shutdowns. The aim of predictive maintenance is to indicate decreasing valve performance and to warn the user before failure is so bad that it causes excessive process variability or even an unexpected shutdown. Online diagnostics can continuously monitor valve performance, but analyzing the results can be very time consuming and labor intensive. The most efficient way to carry out predictive maintenance and online diagnostics is to utilize valve controllers, which are capable of storing results in their memory and send warnings and alarms based on performance limits stored in their memory. In this way, no additional manpower is needed to analyze and study the results continuously, because the intelligent valve controller, with the help of advanced asset management software, can measure valve performance automatically. An example of an intelligent valve controller with online diagnostics is ND9000® from Metso Automation Inc.

U.S. Pat. No. 7,478,012 discloses a computerized evaluation of valve signature graphs. A control valve can be forced to make a full stroke or cycle around the entire characteristic valve signature curve during normal online operation of the control valve. However, the online full stroke test is not possible in most processes, and therefore the partial stroke tests are preferred online. The intelligent valve controller sends the signature test data to a diagnostic monitor which compares the signature data to configured boundaries.

U.S. Pat. No. 6,751,575 discloses monitoring and diagnosing process devices by collecting measured process variables and test results into a history database to be compared with process attribute information stored in databases.

In U.S. Pat. No. 5,115,672 condition or "signature" of a valve is monitored using pipe-mounted ultrasonic transducers that sense the fluid turbulence caused by the valve.

SUMMARY OF THE INVENTION

An object of the present invention is to improve online diagnostics of control valves. This object of the invention is achieved by methods, systems, valve positioners, and a computer program according to the independent claims. The preferred embodiments of the invention are disclosed in the dependent claims.

An aspect of the invention is a method for diagnosing a control valve, comprising measuring position data representing a position of a control valve, and pressure data representing a pressure difference over a valve actuator, and optionally travel direction of the control valve, during online operation of the control valve, processing the position data and the pressure difference data to contain data around starting points of a plurality of individual travel movements of the control valve during normal online operation of the control valve, and determining a valve signature graph of the control valve based on the processed position and pressure difference data, collected at a plurality of points along the travel range of the control valve during online operation of the control valve.

According to another aspect of the invention, a method comprises providing the processed data with time stamps, and determining the updated valve signature graph of the control valve for any desired period of time based on the time-stamped processed position, pressure difference and travel direction data.

According to another aspect of the invention, a method comprises providing the processed data with time stamps, and forming a graph depicting the value of at least one of the processed position data, the processed pressure difference data and the processed travel direction data, or any parameter derived from the processed data, over time based on said time stamps.

According to another aspect of the invention, a method comprises performing said measuring by means of a valve positioner of the valve, transferring raw data to a central diagnostic system, and performing said processing and determining in the centralized diagnostic system.

According to another aspect of the invention, a method comprises performing said measuring and said processing by means of a valve positioner of the valve, sending the processed data to a central diagnostic system, and performing said determining in the centralized diagnostic system.

According to another aspect of the invention, a method comprises regularly polling the valve positioner by the centralized diagnostic system to obtain the raw data or the processed data.

According to another aspect of the invention, a method comprises performing said measuring, said processing and said determining by means of a valve positioner of the valve.

According to another aspect of the invention, a method for diagnosing a control valve comprises measuring position data representing a position of a control valve and pressure data representing a pressure difference over a valve actuator during online operation of the control valve, processing the position and pressure difference data to contain only the pressure difference data sampled when the valve is in a stationary position during normal online operation of the control valve, and determining a valve signature graph of the control valve based on the processed pressure difference data collected at a plurality of points along the travel range of the control valve during online operation of the control valve.

According to another aspect of the invention, said measuring comprises regularly polling a valve positioner by a centralized diagnostic system to obtain unprocessed position and pressure difference data, and wherein said processing and said determining are performed at the centralized diagnostic system.

An aspect of the invention is a valve positioner for operating a control valve, the valve positioner comprising means for measuring position data representing a position of a control valve and pressure data representing a pressure difference over a valve actuator during online operation of the control valve, means for processing the position data and the pressure difference data to contain data around starting points of a plurality of individual travel movements of the control valve during online operation of the control valve, means for storing the processed data at the valve positioner and/or transferring the processed data over a communication bus to a diagnostics system.

According to another aspect of the invention, a valve positioner further comprises means for determining a valve signature graph of the control valve based on the processed position and pressure difference data collected at a plurality of points along the travel range of the control valve during normal online operation of the control valve.

An aspect of the invention is a valve diagnostics system for diagnosing control valves, comprising means for receiving position data and an actuator pressure difference data of a control valve from a valve positioner, the data being measured by the valve positioner during online operation of the control valve, means for processing the position data and the pressure difference data to contain data around starting points of a plurality of individual travel movements of the control valve during online operation of the control valve, and means for determining a valve signature graph of the control valve based on the processed position and pressure difference data collected at a plurality of points along the travel range of the control valve during online operation of the control valve.

An aspect of the invention is a valve diagnostics system for diagnosing control valves, comprising means for receiving position data and an actuator pressure difference data of a control valve from a valve positioner, the data being measured by the valve positioner during online operation of the control valve, means for processing the position and pressure difference data to contain only the pressure difference data sampled when the valve is in a stationary position during normal online operation of the control valve, and means for determining a valve signature graph of the control valve based on the processed pressure difference data collected at a plurality of points along the travel range of the control valve during online operation of the control valve.

An aspect of the invention is a computer program comprising program code means adapted to perform steps of any one of the method aspects recited above when the program is run on a computer or a processor.

An aspect of the invention is a system comprising means for implementing steps of any one of the method aspects recited above.

BRIEF DESCRIPTION OF THE DRAWINGS

In the following the invention will be described in greater detail by means of preferred embodiments with reference to the attached [accompanying] drawings, in which

FIGS. 3A and 3B illustrate behaviour of an actuator pressure difference and the position of the valve with time, respectively, when the valve is moved to a new position;

FIG. 4 is a flow diagram illustrating a diagnostics method according to an exemplary embodiment of the invention;

EXAMPLE EMBODIMENTS OF THE INVENTION

The present invention can be applied in diagnosis of any control valves and their valve controllers (positioners) and actuators in any industrial process and the like.

Figure 1:
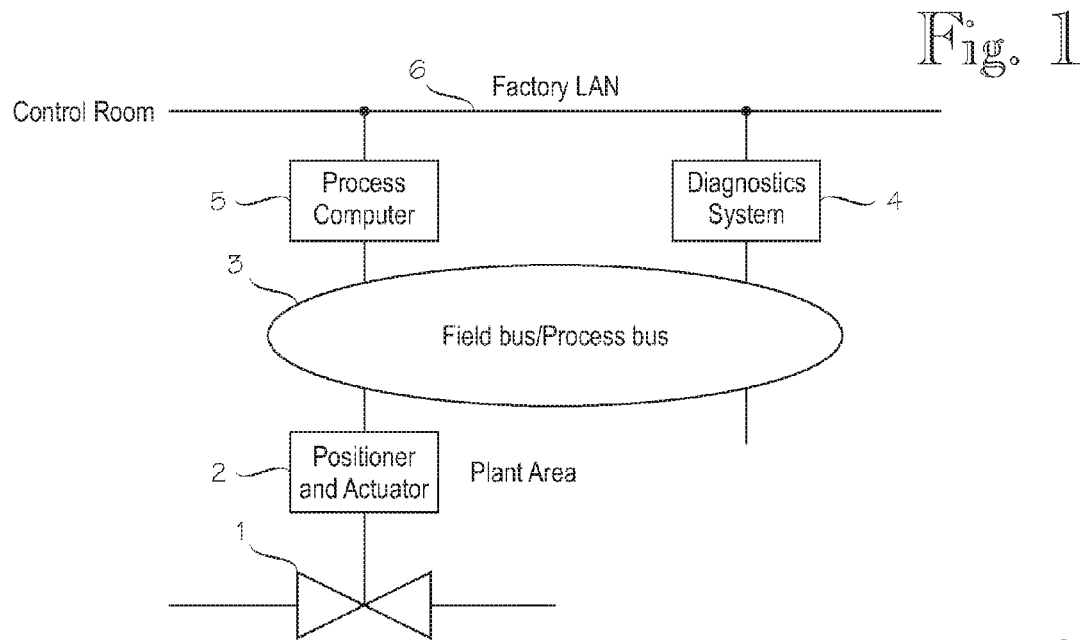
FIG. 1 shows a schematic block diagram of an exemplary process automation system and a field device management system.

FIG. 1 shows a schematic block diagram of an exemplary process automation system and a field device management system wherein the principles of the invention may be applied. The control system block 5 generally represents any and all control room computer(s)/programs and process control computer(s)/programs as well as databases in the automation system. There are various architectures for a control system. For example, the control system may be a Direct Digital Control (DDC) system or a Distributed Control System (DCS), both well known in the art.

There are various alternative ways to arrange the interconnection between the control system and field devices, such as control valves, in a plant area. In FIG. 1, the field/process bus 3 generally represents any such interconnection. Traditionally, field devices have been connected to the control system by two-wire twisted pair loops, each device being connected to the control system by a single twisted pair providing a 4 to 20 mA analog input signal. More recently, new solutions, such as Highway Addressable Remote Transducer (HART) protocol, that allow the transmission of digital data together with the conventional 4 to 20 mA analog signal in the twisted pair loop have been used in the control systems. The HART protocol is described in greater detail for example in the publication HART Field Communication Protocol: An Introduction for Users and Manufacturers, HART Communication Foundation, 1995. The HART protocol has also been developed into an industrial standard. Examples of other fieldbuses include Fieldbus and Profibus. However, it is to be understood that the type or implementation of the field/process bus 3 is not relevant to the present invention. The field/process bus 3 may be based on any one of the alternatives described above, or on any combination of the same, or on any other implementation.

In the example of FIG. 1, a control valve 1 is connected to a process to control the flow of a substance in the process pipeline. The material flow may contain any fluid material, such as fluids, liquors, liquids, gases and steam. Position (opening) of control valve 1 is operated by means of a valve controller (positioner) and actuator 2. More specifically, position of a closure element, the moving part of the control valve, situated in the flow stream, is operated to control the flow through the valve. The closure element may be e.g., a plug, a clapper, a ball, depending on the type of the valve. An actuator is a device mount on valve and moves a valve to a desired position using an outside power source, such as pneumatic pressure. A valve positioner compares a control signal to a valve actuator's position and moves the actuator accordingly. In the example of FIG. 1, only one control valve is shown, but an automation system may, however, include any number of field devices, such as control valves, often hundreds of them. Examples of intelligent valve controllers/positioners include models ND800 and ND9000® from Metso Automation Inc.

The field devices may be managed using a field device management and diagnostics system 4. The management and diagnostics system 4 may further be connected to a local area network LAN of the factory, which allows it to communicate with the control room programs, for example. Alternatively, the field device management and diagnostics system 4 or similar functionality may be integrated into the control system 5, e.g. into control room or process control computers. The management and diagnostics system 4 may be connected to the field devices (e.g. valve controller 2) over the field/process bus 3, as described above. For example, each field device may have a dedicated fieldbus connecting it to a HART multiplexer, which is in turn connected to the management and diagnostics system 4. The management and diagnostics system 4 may comprise a computer work station provided an appropriate management and diagnostics program. Example of a management and diagnostics system is a computer provided with Neles FieldCare software from Metso Automation Inc. Neles FieldCare is universal FDT/DTM (Field Device Tool/Device Type Manager)-based software. One of the features of Neles FieldCare is on-line condition monitoring which enables to collect on-line data from field devices and provides tools for predictive maintenance planning.

Figure 2:
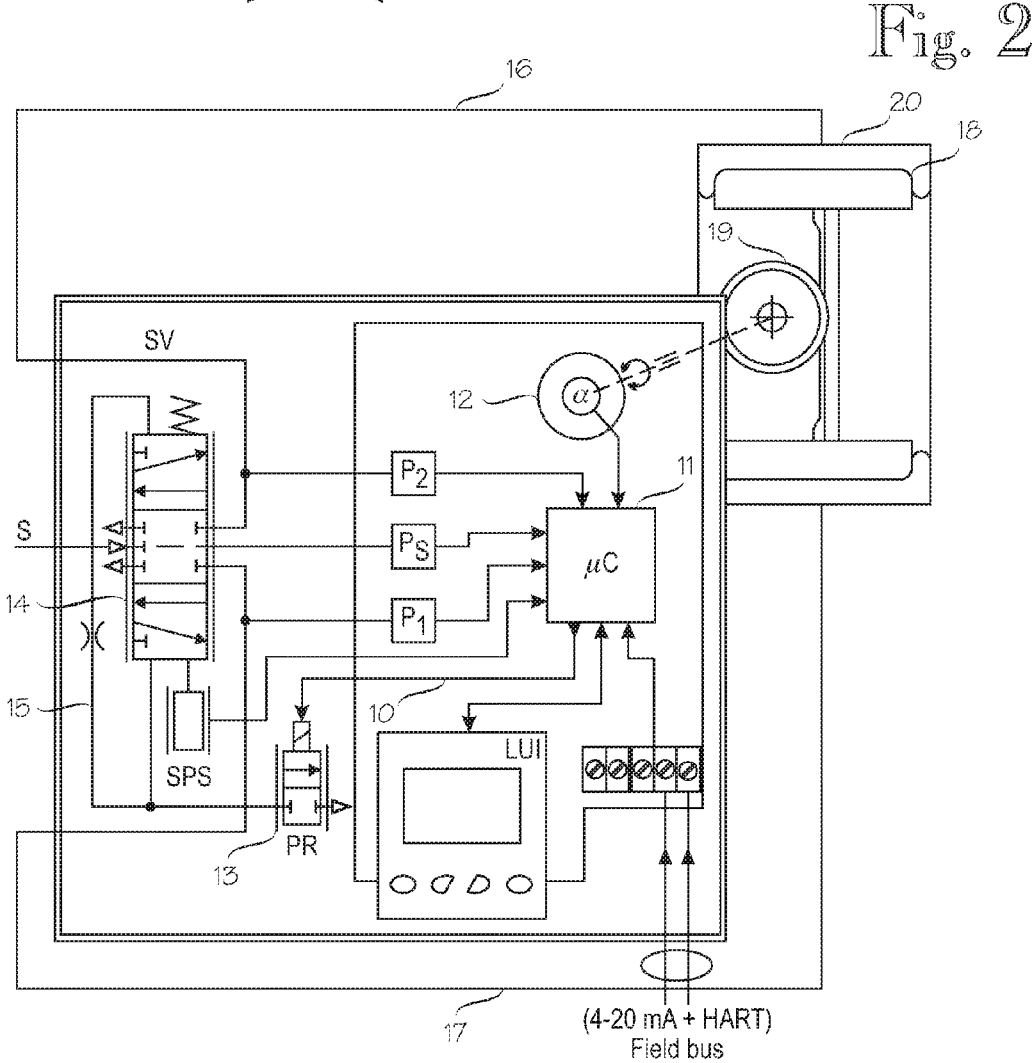
FIG. 2 illustrates an example block diagram of a microcontroller-based intelligent valve controller.

An example block diagram of microcontroller-based intelligent valve controller is illustrated in FIG. 2. The device may contain a Local User Interface (LUI) enabling local configuration. A microcontroller 11 controls the valve position. To that end, the microcontroller 11 may receive an input signal (a set point) over a process/fieldbus 3, such as 4-20 mA pair and HART, and may perform various measurements. The device may be powered from a 4-20 mA or fieldbus. After connections of electric signal and pneumatic supply S, the microcontroller 11 reads the input signal, a position sensor 12, a supply pressure sensor Ps, a first actuator pressure sensor P1, a second actuator pressure sensor P2, and a spool position sensor SPS. A difference between the set point defined by the input signal and the position measured by the position sensor 12 is detected by means of a control algorithm inside the microcontroller 11. The microcontroller 11 calculates a new value for prestage (PR) coil current 10 based on the information from the input signal and from the sensors. Changed current 10 to the PR changes the pilot pressure 15 to the spool valve 14. Reduced pilot pressure 15 moves the spool and the actuator pressures 15 and 16 change accordingly. In FIG. 2, the spool is shown in the middle position wherein the actuator pressures are at their middle levels, e.g. equal (P1−P2=0). When the spool moves (e.g. downwards in FIG. 2), the spool opens the flow to the driving side of the double diaphragm actuator 20 (e.g. the channel illustrated by the upper inclined arrow connects the actuator pressure line 16 to the pneumatic supply S) and opens the flow out from the other side of the actuator 20 (e.g. the channel illustrated by the upper horizontal arrow connects the actuator pressure line 15 to the exhaust port in the spool valve 14). The increasing pressure will move the diaphragm piston 18. The actuator and feedback shaft 19 rotate. The position sensor 12 measures the rotation for the microcontroller 11. The microcontroller 11 modulates the PR-current 10 from the steady state value until a new position of the actuator 20 according to the input signal is reached. The movement (travel) of the control valve in the opposite direction is obtained by causing the spool move to the opposite direction (e.g. upwards, the line 16 is connected to an exhaust port, and the line 17 is connected to the pneumatic supply S). It should be appreciated that the illustrated valve controller is merely an example and the invention is not limited any specific implementation of a valve controller. It is only essential that a valve controller is able to measure an actuator pressure difference (e.g. P2–P1) and a valve position. It should be appreciated that the valve position may be measured also indirectly, for example by measuring the position of an actuator, so that the actuator position data represents the position of the valve.

Friction is one of the most common factors that may cause poor performance in a control valve. In linear valves, friction is affected mostly by the packing. In rotary valves, it is typically the sealing (or seat) that causes friction. In addition to friction, problems such as backlash, are commonly associated with rotary control valves. Further, during online operation, there are also friction forces caused by the material flow through the valve. Particularly in ball valves there is a significant change in friction of a closure element when the pressure difference across the valve is high.

Let us examine the effect of the valve friction to the operation of the valve, using the valve controller of FIG. 2 as an example. An example of the behaviour of an actuator pressure difference and the position of the valve with time when the valve is moved to a new position is illustrated in FIGS. 3A and 3B respectively. The valve is stationary in a first position X1. The microprocessor 11 receives a new set point, i.e. a new position X2 which the valve should be adjusted to. As described above, the pneumatic pressure (e.g. P1) to the driving side of the double diaphragm actuator 20 is increased and the pneumatic actuator pressure (e.g. P2) to other side of the actuator 20 is decreased to increase the pressure difference (e.g. P1–P2) and to move the actuator and the valve to the new position X2. When the actuator starts (at time instant t0) to move the valve from the present position X1 to the new position X2, the pneumatic pressure to the driving side of the actuator 20 and thereby the actuator pressure difference P1–P2 has to be continuously increased until it finally (the pressure difference Pf at time instant t1) overcomes friction in this direction and the valve starts to move. When the valve moves, a lower actuator pressure difference P1–P2 than the Pf is needed for moving the valve. The microprocessor 11 detects the start of the valve movement by means of the position sensor 12, and adjusts the actuator pressure by means of the prestage (PR) coil current according a control algorithm, as described above. With a lower valve friction, the behaviour of the pressure difference may be as illustrated by the dotted line 31 in FIG. 3A.

According to an aspect of the invention, a position of a control valve and a pressure difference over a valve actuator, and optionally travel direction of the control valve, is monitored during normal online operation of the control valve (step 41 in FIG. 4). According to exemplary embodiments of the invention, the valve controller, e.g. the microprocessor 11 of the valve controller, is arranged to sample the actuator pressures P1, P2, and the valve position at a predetermined sampling frequency for each individual valve travel during the online operation of the control valve, and to store the sample values in an internal memory of the valve controller, and/or to transfer (actively or on demand) the sample values to the management and diagnostics system 4 over the field/process bus 3. The sampling can be made at relatively high sampling rate in relation to the changes in friction, the actuator pressures and the position. The sampling rate may preferably be in a range from 1 to 500 milliseconds. This results in higher accuracy and reliability of the measurement and diagnosis. Preferably, instead of both actuator pressures P1 and P2, an actuator pressure difference P1–P2 calculated based on the samples may be stored. In preferred embodiments, monitoring, in addition to the position of the control valve and the pressure difference over the valve actuator, also a travel direction of the control valve during normal online operation of the control valve may be monitored, and information on travel direction is associated with the sampled pressure and position values of each individual valve travel event. In some embodiments, the sampled actuator pressure difference data and the sampled valve position data are stored in different data structures, such as vectors, for different travel directions. Further, in some embodiments, a time stamp may be associated with the data of each individual valve travel event.

In some embodiments, the position data and the actuator pressure difference data may be processed to contain data around starting points of a plurality of individual travel movements of the control valve during normal online operation of the control valve (step 42 in FIG. 4). Such processing, e.g. filtering, of the sampled data decreases the memory capacity needed at the valve controller, or the amount of data to be transferred to the management and diagnostics system 4. Preferably, only the actuator pressure difference data and the valve position data which are sampled around the starting moment of the valve travel, e.g. around time instant t1, or around time period t0-t1, or around time period t1-t2, or around time period t0-t2, are stored in the valve controller and/or transferred to the diagnostics system 4. The "around" may typically be a period of time in order of milliseconds or dozens of milliseconds. Further, in some embodiments, a time stamp may be associated with the processed data of each individual valve travel event (step 43 in FIG. 4).

Then a valve signature graph of the control valve can be determined (e.g. calculated) on the basis of the processed position and pressure difference data collected at a plurality of points along the travel range of the control valve during normal online operation of the control valve (step 44 in FIG. 4). As the control valve typically moves frequently during the online operation, the actuator pressure difference data and the valve position data for a plurality of valve travel events will be collected during a reasonable collecting period, that may in order of days, weeks or months, for example. In other words, the valve position and pressure difference data collected at a plurality of points along the travel range of the control valve are obtained during normal online operation of the control valve. This online data will be sufficient for determining and presenting a valve signature graph without performing separate "valve signature" tests for the valve. Thus, offline tests, or online tests disturbing the process can be avoided.

Similarly as the processing of the data, also the determining (e.g. calculation) of the valve signature may performed locally at each valve controller, centrally at the management and diagnostics system 4, or these procedures may be suitably distributed among the valve controller and the diagnostics system.

Figure 5:
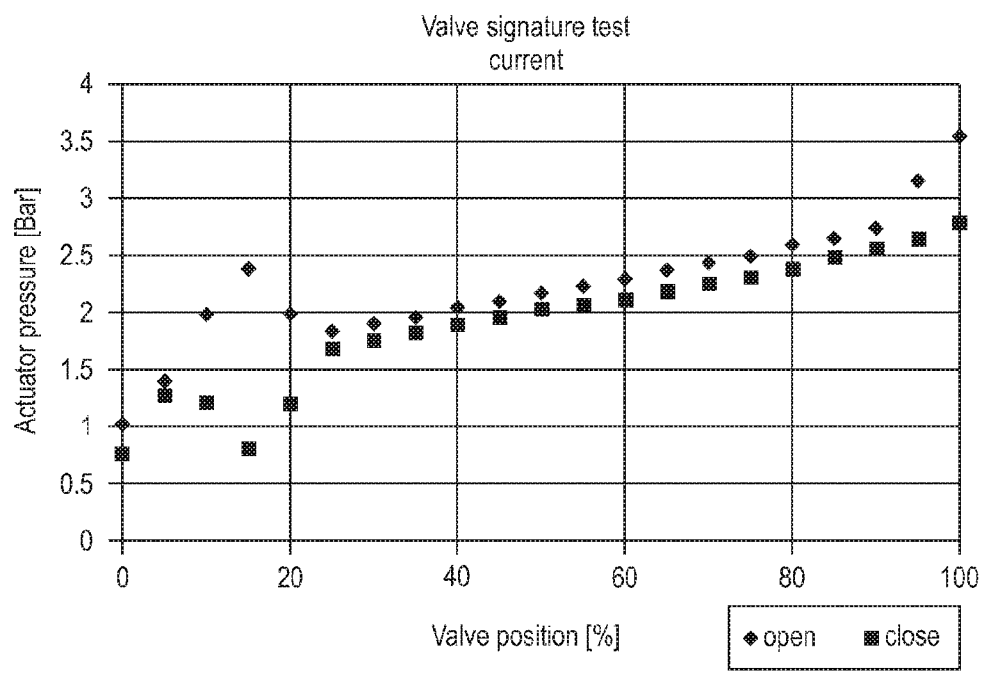
FIG. 5 shows an example of a valve signature graph display.
Figure 6:
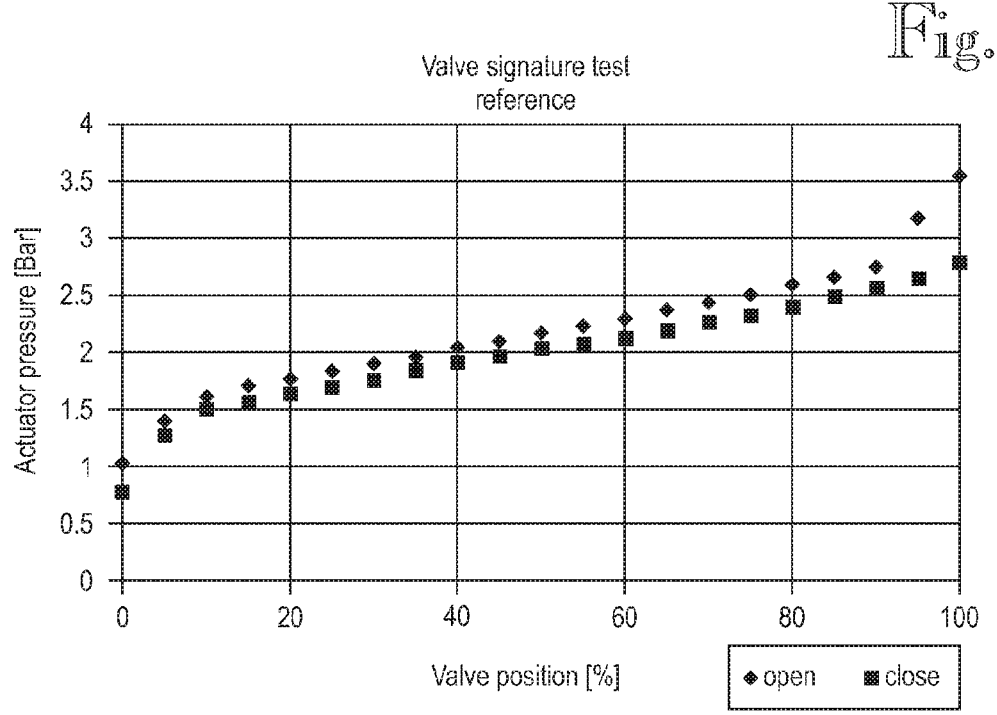
FIG. 6 shows an example of a reference valve signature graph display.
Figure 7:
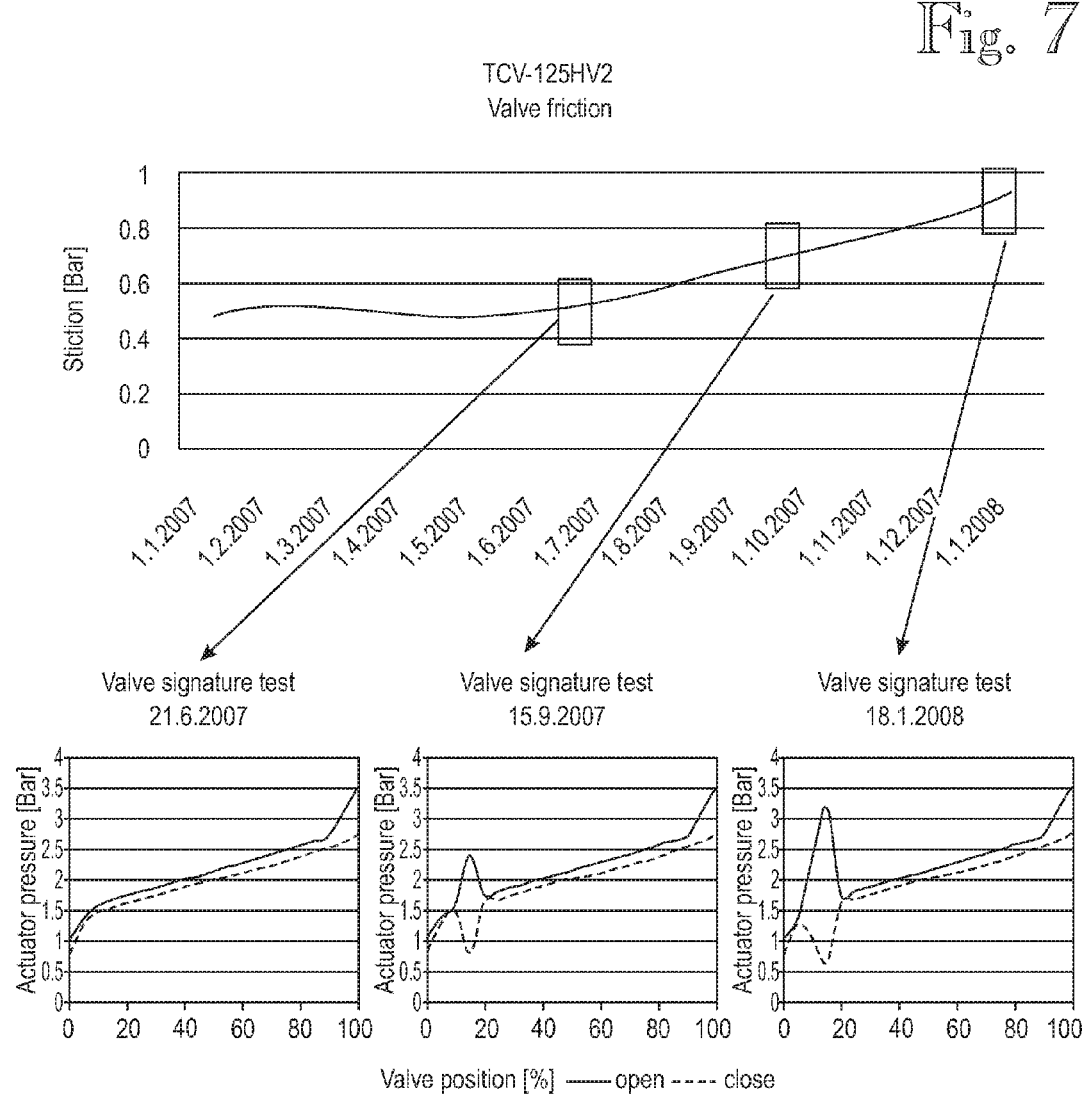
FIG. 7 shows an example of a graph display illustrating the valve friction or actuator pressure in function of time, as well as several valve signature graphs.

In an embodiment of the invention, the processing of the sampled data to contain only the data around starting points of a plurality of individual travel movements of the control valve during normal online operation of the control valve is performed in the valve controller 2, e.g. by the microcontroller 11. Such processed data may contain the pressure difference, the valve position, the travel direction, and the time stamp. The valve controller may send the processed data to the diagnostics system at suitable times. For example, the valve controller may send the processed data soon after the valve has begun to move. As another example, the diagnostics system 4 may poll or request the processed data from the valve controller at suitable times. The diagnostics system 4 collects and stores the processed data. When a sufficient amount of data has been collected, the diagnostics system 4 determines the current valve signature graph, and stores and/or displays the signature test data or graph to users on user interface, e.g. on a graphics display. An example of a valve signature graph display is shown in FIG. 5. The diagnostics system 4 may also generate based on the stored data, a valve signature graph for any specific moment requested by a user through the user interface. The diagnostics system 4 may also show valve signature graphs of different times on the display at the same time, thereby enabling the user to analyse the change in the valve over time. The diagnostics system 4 may also store at least one reference signature graph which the subsequent graph(s) can be compared with, e.g. a valve signature graph determined at the initial startup of the control valve. An example of a reference valve signature graph display is shown in FIG. 6. The diagnostics system 4 may also provide the valve signature graph display with other information, such as alarms, limits, etc. The diagnostics system 4 may also generate other displays and graphs based on the collected data, such as a graph illustrating the valve friction or actuator pressure in function of time. An example of such graph display is illustrated in FIG. 7. In the example of FIG. 7, the display view also contains valve signature graphs for several time points in the valve friction valve. By comparing the graphs the user may easily observe how the behaviour of the valve has changed with the time and determine whether the valve requires service. Determining of the valve signature graph at the diagnostics system allows more freedom in visualization of the data, but on the other hand the diagnostics system must poll the valve controllers frequently and retrieve significant amounts of data.

In another embodiment of the invention, in addition to performing the processing, the valve controller (e.g. the microcontroller 11 in the valve controller) also determines the valve signature graph and stores it in the internal memory. In this approach, the diagnostics system 4 does not have to poll the field devices and collect the processed data, but it can display the finalized signature test data or graph to users. The valve controller may store a plurality of valve signatures for different monitoring times. Alternatively, the valve controller may store the processed data, and determined a valve signature graph when requested by the diagnostics system 4. The valve controller may also generate, based on the stored data, a valve signature graph for any specific moment requested by a user through the user interface at the diagnostics system. The valve controller may also produce valve signature graphs of different times to be shown on the display at the same time, thereby enabling the user to analyse the change in the valve over time. The valve controller may also store at least one reference signature graph which the subsequent graph(s) can be compared with, e.g. a valve signature graph determined at the initial startup of the control valve. The valve controller may also provide the valve signature graph display with other information, such as alarms, limits, etc. The valve controller may also generate other displays and graphs based on the collected data, such as a graph illustrating the valve friction or actuator pressure in function of time. Determining of the valve signature graph in the valve controller reduces polling of the valve controllers by the diagnostics system and reduces the amount of data transferred over the process/field bus.

Figure 8:
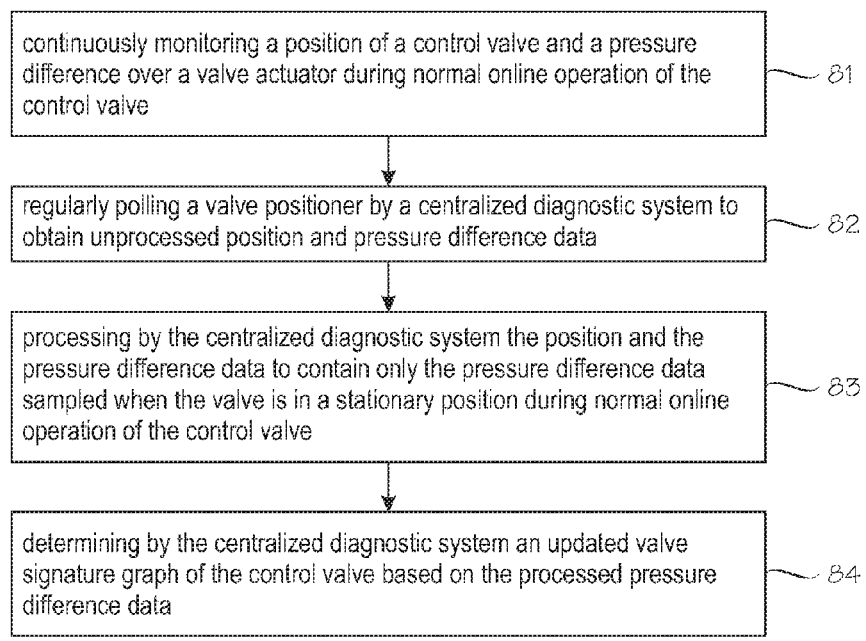
FIG. 8 is a flow diagram illustrating a diagnostics method according to another exemplary embodiment of the invention.
Figure 9:
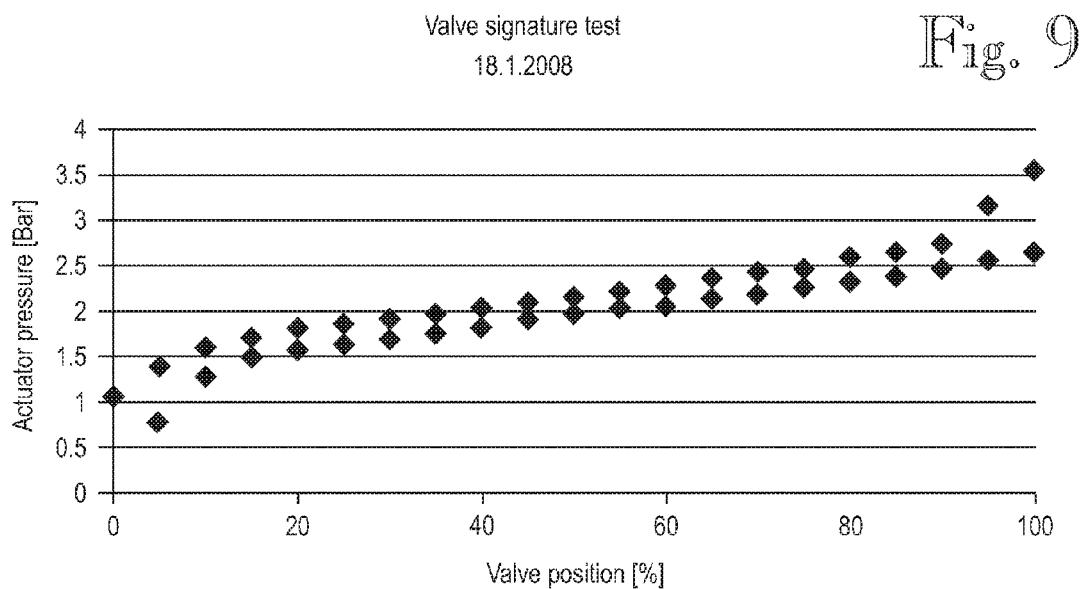
FIG. 9 shows an example of a "coarse" valve signature graph.

According to a further aspect of the invention, the monitoring (step 81 in FIG. 8) may include that the diagnostics system 4 may poll the valve controller at suitable times, retrieve the sampled position and actuator pressure data from the valve controller over the process/field bus 3 (step 82 in FIG. 8). The diagnostics system 4 may accept for processing only the position samples and the actuator pressure samples that are sampled when the valve has stopped, i.e. the valve is in a stationary position (step 84 in FIG. 8) and determine a valve signature graph or an actuator pressure graph based on this processed pressure difference data (step 84 in FIG. 8). The centralized data gathering over the process/field bus 3 allows only a low sampling rate in relation to the fast friction changed in the beginning of the valve movement. Therefore this approach does provide detailed and accurate information on the friction at the beginning of an individual valve travel event, but it provides coarse information on change in the friction behaviour of the valve over time, e.g. by monitoring the scattering of the actuator pressure values at the stationary positions. On the other hand, the result of this diagnostics method is not very reliable. The most important advantage is that this approach does not require any modifications to the existing valve controllers/positioners, so that this approach can be implemented for already installed devices in a process. An example of such "coarse" valve signature graph is illustrated in FIG. 9.

There may be valve controllers according to different embodiments of the invention in the same system, and the management and diagnostics system may poll each type of valve controllers and process their data differently. In other words, the "coarse" diagnostics described above may be applied to the existing installed valve controllers, and one or more of the more sophisticated diagnostics described above may be applied to newly installed valve controllers.

The techniques described herein may be implemented by various means. For example, these techniques may be implemented in hardware (one or more devices), firmware (one or more devices), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) and executed by one or more processors/computers. The data storage medium or the memory unit may be implemented within the processor/computer or external to the processor/computer, in which case it can be communicatively coupled to the processor/computer via various means as is known in the art. Additionally, components of systems described herein may be rearranged and/or complimented by additional components in order to facilitate achieving the various aspects, goals, advantages, etc., described with regard thereto, and are not limited to the precise configurations set forth in a given figure, as will be appreciated by one skilled in the art.

The description and the related figures are only intended to illustrate the principles of the present invention by means of examples. Various alternative embodiments, variations and changes are obvious to a person skilled in the art on the basis of this description. The present invention is not intended to be limited to the examples described herein but the invention may vary within the scope and spirit of the appended claims.

The invention claimed is:
1. A valve positioner for operating a control valve, the valve positioner comprising:

a pneumatic supply connection to a pneumatic supply pressure, a first pneumatic actuator connection and a second pneumatic actuator connection to opposite sides of a pneumatic valve actuator cylinder installed to change a position of a control valve, a pneumatic output stage connected to the pneumatic supply connection and the first and second pneumatic connections to supply a first pneumatic actuator pressure and a second pneumatic actuator pressure, respectively, to the opposite sides of the pneumatic valve actuator cylinder according to a control signal, at least one position sensor configured to measure a position of the control valve, at least one pressure sensor configured to measure a pressure difference of the first and second pneumatic actuator pressures over the pneumatic valve actuator cylinder during online operation of the control valve, a microprocessor system connected to the at least one position sensor and to the at least one pressure sensor to receive the measured position and the measured pressure difference and configured to generate the control signal to the pneumatic output stage, the microprocessor system detecting a starting point of an individual travel movement and selectively processing the measured position and the measured pressure difference which are immediately around the detected starting point of each individual travel movement of the control valve and excluding the measured position and the measured pressure difference that is not immediately around the detected starting point, thereby producing a reduced amount of processed position data and pressure difference data at the starting points of a plurality of individual travel movements of the control valve during online operation of the control valve, a memory configured to store the reduced amount of processed position data and pressure difference data at the valve positioner.

2. A valve positioner according to claim 1, wherein the microcontroller is further configured to determine the microprocessor system is configured to determine a valve signature graph of the control valve based on the processed position and pressure difference data collected at a plurality of points along the travel range of the control valve during online operation of the control valve.

3. A valve positioner for operating a control valve, the valve positioner comprising:

a pneumatic supply connection to a pneumatic supply pressure, a first pneumatic actuator connection and a second pneumatic actuator connection to opposite sides of a pneumatic valve actuator cylinder installed to change a position of a control valve, a pneumatic output stage connected to the pneumatic supply connection and the first and second pneumatic connections to supply a first pneumatic actuator pressure and a second pneumatic actuator pressure, respectively, to the opposite sides of the pneumatic valve actuator cylinder according to a control signal, at least one position sensor configured to measure a position of a control valve, at least one pressure sensor configured to measure a pressure difference of the first and second pneumatic actuator pressures over the pneumatic valve actuator cylinder during online operation of the control valve, a microprocessor system connected to the at least one position sensor and to the at least one pressure sensor to receive the measured position and the measured pressure difference and configured to generate the control signal to the pneumatic output stage, the microprocessor system detecting starting point of an individual travel movement and selectively processing the measured position and the measured pressure difference which are immediately around the detected starting point of each individual travel movement of the control valve and excluding the measured position and the measured pressure difference that is not immediately around the detected starting point, thereby producing a reduced amount of processed position data and pressure difference data at starting points of a plurality of individual travel movements of the control valve during online operation of the control valve, a communication interface configured to transfer the reduced amount of the processed position data and the pressure difference data over a communication bus to a diagnostics system.

4. A valve positioner according to claim 3, wherein the microcontroller is further configured to determine the microprocessor system is configured to determine a valve signature graph of the control valve based on the processed position and pressure difference data collected at a plurality of points along the travel range of the control valve during online operation of the control valve.

* * * * *